US012647446B2

(12) United States Patent
Benefield et al.

(10) Patent No.: US 12,647,446 B2
(45) Date of Patent: Jun. 2, 2026

(54) SYSTEMS AND METHODS FOR ADVANCED VULNERABILITY DETECTION AND REMEDIATION WITHIN COMPUTER NETWORKS

(71) Applicant: MASTERCARD INTERNATIONAL INCORPORATED, Purchase, NY (US)

(72) Inventors: William Henry Benefield, Barndarrig (IE); Deborah Gil Alvarez, Dublin (IE); Hubert Graja, Dublin (IE); Mihhail Sapovalov, Dublin (IE); Rogerio B. Pitzer, Kilcock (IE); Tim M. Watkins, Tacoma, WA (US)

(73) Assignee: Mastercard International Incorporated, Purchase, NY (US)

( * ) Notice: Subject to any disclaimer, the term of this patent is extended or adjusted under 35 U.S.C. 154(b) by 85 days.

(21) Appl. No.: 18/442,836

(22) Filed: Feb. 15, 2024

(65) Prior Publication Data

US 2025/0267162 A1     Aug. 21, 2025

(51) Int. Cl.
　G06F 21/57　　　(2013.01)
　G06F 8/65　　　　(2018.01)
　　　　　(Continued)

(52) U.S. Cl.
　CPC ............ H04L 63/1433 (2013.01); G06F 8/65 (2013.01); H04L 41/0813 (2013.01)

(58) Field of Classification Search
None
See application file for complete search history.

(56) References Cited

U.S. PATENT DOCUMENTS 7,260,844 B1　8/2007　Tidwell et al.
7,346,922 B2　3/2008　Miliefsky
　　　　　(Continued)

FOREIGN PATENT DOCUMENTS

CA　　　3055978 A1 *　5/2020　......... H04L 63/1433
JP　　2008197877 A　　8/2008
　　　　　(Continued)

OTHER PUBLICATIONS

PCT International Search Report and Written Opinion dated Dec. 30, 2013 for related matter PCT/US2013/059701.
　　　　　(Continued)

*Primary Examiner* — Christopher B Robinson
(74) *Attorney, Agent, or Firm* — Armstrong Teasdale LLP

(57)　　　　ABSTRACT

A system for dynamic vulnerability detection and remediation is provided. The system includes a memory device and at least one processor coupled to the memory device. The at least one processor is programmed to: (a) store within a database an inventory of computer assets included within a computer ecosystem; (b) retrieve a vulnerability report including vulnerability definitions; (c) analyze the database to identify a potential vulnerability by comparing the computer assets stored within the database to the vulnerability definitions; (d) upon detecting the potential vulnerability, determine a service owner associated with the computer assets identified as being involved in the potential vulnerability; and (e) provide content to a user computing device associated with the service owner causing the user device to display a notification alert advising the service owner of the potential vulnerability and providing a remediation plan to address the potential vulnerability.

15 Claims, 5 Drawing Sheets

(51) Int. Cl.
    *H04L 9/40*           (2022.01)
    *H04L 41/0813*     (2022.01)

(56)               References Cited

U.S. PATENT DOCUMENTS

| 7,451,488 | B2 | 11/2008 | Cooper | |
| 7,613,625 | B2 | 11/2009 | Heinrich | |
| 7,743,421 | B2 | 6/2010 | Cosquer et al. | |
| 7,861,299 | B1 | 12/2010 | Tidwell et al. | |
| 7,926,113 | B1* | 4/2011 | Gula | H04L 63/1425 |
| | | | | 726/25 |
| 8,201,257 | B1 | 6/2012 | Andres et al. | |
| 8,844,045 | B2 | 9/2014 | Benefield | |
| 10,708,292 | B2 | 7/2020 | Gerrick | |
| 11,418,529 | B2 | 8/2022 | Colquhoun | |
| 2007/0067846 | A1 | 3/2007 | McFarlane | |
| 2007/0067848 | A1* | 3/2007 | Gustave | G06F 21/577 |
| | | | | 726/25 |
| 2007/0169199 | A1 | 7/2007 | Quinnell et al. | |
| 2007/0192867 | A1 | 8/2007 | Miliefsky | |
| 2008/0005784 | A1 | 1/2008 | Miliefsky | |
| 2008/0201780 | A1 | 8/2008 | Khan et al. | |
| 2012/0185945 | A1 | 7/2012 | Andres et al. | |
| 2012/0216177 | A1 | 8/2012 | Fink et al. | |
| 2012/0304300 | A1 | 11/2012 | LaBumbard | |
| 2018/0020021 | A1 | 1/2018 | Gilmore et al. | |
| 2018/0129810 | A1* | 5/2018 | Kim | G06F 16/90344 |
| 2019/0166149 | A1* | 5/2019 | Gerrick | G06F 21/577 |
| 2021/0392153 | A1* | 12/2021 | Bubshait | G06F 8/65 |
| 2022/0159028 | A1 | 5/2022 | Kumar et al. | |
| 2022/0217173 | A1* | 7/2022 | Cavallaro Corti | G06F 40/205 |
| 2023/0216875 | A1 | 7/2023 | Barbosa et al. | |
| 2023/0370486 | A1* | 11/2023 | Paquette | H04L 63/1433 |
| 2023/0388324 | A1* | 11/2023 | Thompson | H04L 63/1416 |
| 2025/0124137 | A1* | 4/2025 | Black | G06F 8/71 |

FOREIGN PATENT DOCUMENTS

| KR | 20120061335 A | 6/2012 |
| WO | 2004075006 A2 | 9/2004 |
| WO | 2012011070 A1 | 1/2012 |

OTHER PUBLICATIONS

"NVD CPE Match Feed", Retrieved from Internet: https://nvd.nist.gov/general/News/CPE-Match-Feed-1-0-Release.

"NVD Data Feeds", Retrieved from Internet: https://nvd.nist.gov/vuln/data-feeds#APIS.

"CVE-2021-44228 Detail", Retrieved from Internet: https://nvd.nist.gov/vuln/detail/CVE-2021-44228.

"NIST NVD (Independent Publisher) (Preview)" Retrieved from Internet: https://learn.microsoft.com/en-us/connectors/nistnvdip/.

"Synk Security", Retrieved from Internet: https://security.snyk.io/vuln/?search=CVE-2022-23302.

"Snyk Vulnerability Database", Retrieved from Internet: https://security.snyk.io/.

PCT International Search Report and Written Opinion, Application No. PCT/US2025/013133, dated May 16, 2025, 15 pages.

* cited by examiner

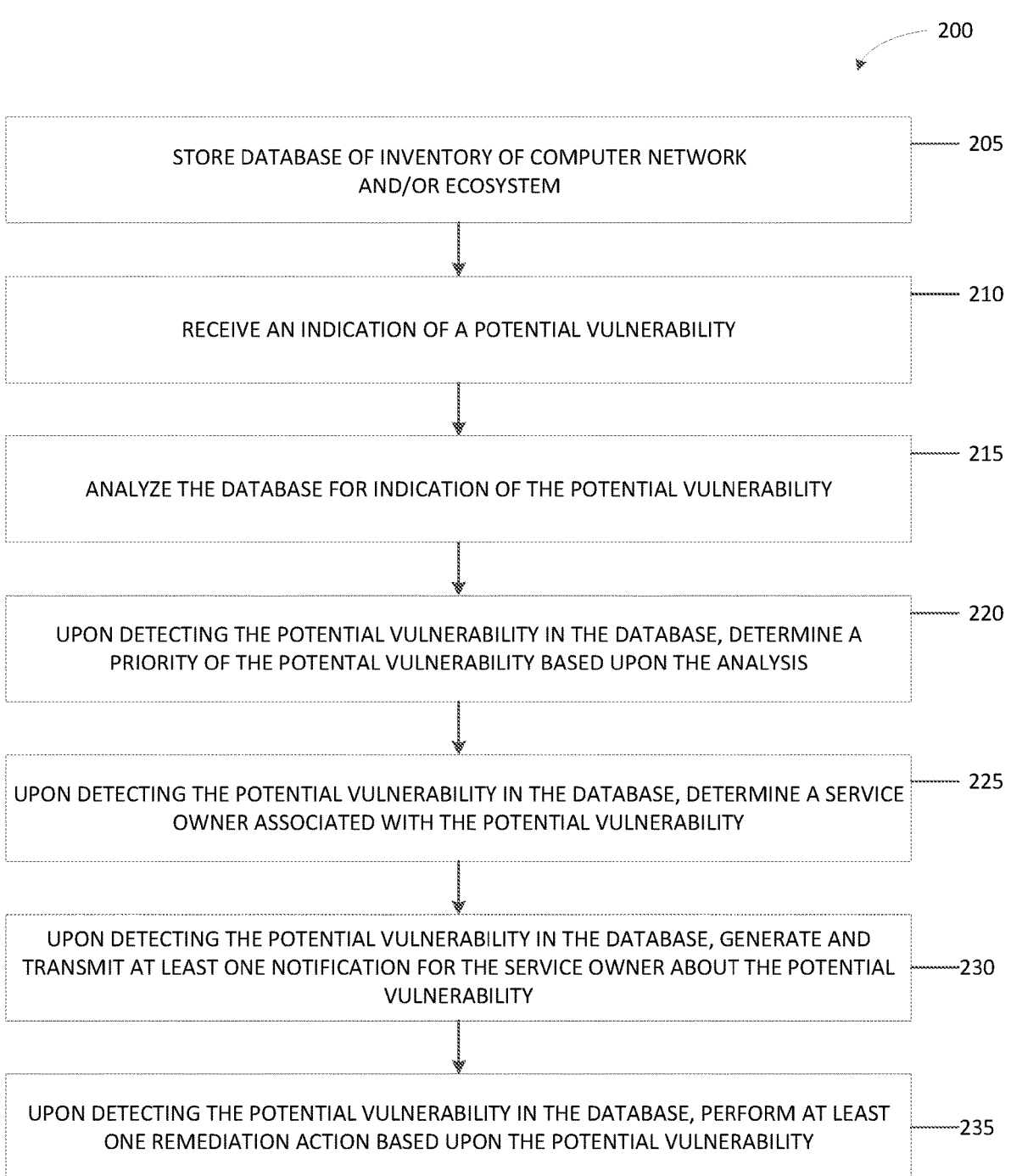

200

205

STORE DATABASE OF INVENTORY OF COMPUTER NETWORK
AND/OR ECOSYSTEM

210

RECEIVE AN INDICATION OF A POTENTIAL VULNERABILITY

215

ANALYZE THE DATABASE FOR INDICATION OF THE POTENTIAL VULNERABILITY

220

UPON DETECTING THE POTENTIAL VULNERABILITY IN THE DATABASE, DETERMINE A
PRIORITY OF THE POTENTAL VULNERABILITY BASED UPON THE ANALYSIS

225

UPON DETECTING THE POTENTIAL VULNERABILITY IN THE DATABASE, DETERMINE A SERVICE
OWNER ASSOCIATED WITH THE POTENTIAL VULNERABILITY

230

UPON DETECTING THE POTENTIAL VULNERABILITY IN THE DATABASE, GENERATE AND
TRANSMIT AT LEAST ONE NOTIFICATION FOR THE SERVICE OWNER ABOUT THE POTENTIAL
VULNERABILITY

235

UPON DETECTING THE POTENTIAL VULNERABILITY IN THE DATABASE, PERFORM AT LEAST
ONE REMEDIATION ACTION BASED UPON THE POTENTIAL VULNERABILITY

COMM.
INTERFACE

505

PROCESSOR

510

MEMORY

520

STORAGE
INTERFACE

525

STORAGE
DEVICE

TO/FROM
REMOTE
DEVICE

1

SYSTEMS AND METHODS FOR ADVANCED VULNERABILITY DETECTION AND REMEDIATION WITHIN COMPUTER NETWORKS

BACKGROUND

The present application relates generally to automated cybersecurity vulnerability remediation, and more particularly, to computer-based systems and methods for managing cybersecurity vulnerability detection and remediation.

In cybersecurity testing and protection, many computer networks rely on their security tools to protect their networks from malicious actors. However, there is a lag between when new methods of compromise are developed and put into use, and when the security tools are updated to detect and protect from those new methods of compromise. Many companies have cyber threat intelligence teams that evaluate and track threats that may target and impact their networks. A critical part of threat intelligence is assessing the networks' threat posture for would-be threats and utilizing telemetry to make informed decisions guiding security operations.

Threat intelligence teams assess and understand threats. This includes manual work to understand known tactics and attempting to determine the current posture of tools, networks, and systems would be for attacks. As attackers are known to use a variety of different techniques, such as exploiting zero-day vulnerabilities (e.g., on an endpoint) or conducting phishing campaigns in the hopes of a user clicking on a link, threat intelligence teams are typically only able to react to these attacks after identifying, sharing, and addressing these vulnerabilities. These attacks are then only addressed after the vulnerabilities have been observed and verified on a network and computer systems. This includes using known or discovered vulnerabilities to perform basic threat hunting, generating monitoring alerts, and sharing threat intelligence information about active attacks. However, attackers are increasingly capable of shifting their tactics using different domains, variants of malware, and additional other resources that increases the likelihood that they are able to bypass controls and obtain access. This increases pressures on Incident Response teams and increases alert fatigue on cybersecurity analysts.

It is important to respond quickly when urgent security remediation activities are needed. However, it may often take organizations weeks or months to detect and remediate each vulnerability. Many of these systems and users are dependent on third party tools (commercial or open-source vulnerability scanning solutions) to build custom scan modules. The threat intelligence teams may then roll those scans out across the company or enterprise. Especially in enterprise networks, directly scanning every system for newly discovered vulnerabilities across the network in a timely fashion is not a viable approach. This would cause the threat intelligence teams to take months to resolve critical vulnerabilities. These known approaches are much too expensive and time consuming to deploy. Thus, these known approaches expose these enterprise-wide computer assets to significant risk of being compromised. To better address these threats, a more proactive means of assessing threats is needed.

BRIEF DESCRIPTION

In one aspect, a dynamic vulnerability detection and remediation system is provided. The dynamic vulnerability detection and remediation system includes a memory device and at least one processor coupled to the memory device. The at least one processor is programmed to (a) store within a database an inventory of computer assets included within a computer ecosystem; (b) retrieve a vulnerability report including vulnerability definitions; (c) analyze the database to identify a potential vulnerability by comparing the computer assets stored within the database to the vulnerability definitions; (d) upon detecting the potential vulnerability, determine a service owner associated with the computer assets identified as being involved in the potential vulnerability; and (e) provide content to a user computing device associated with the service owner causing the user device to display a notification alert advising the service owner of the potential vulnerability and providing a remediation plan to address the potential vulnerability.

In another aspect, a computer-implemented method for dynamic vulnerability detection and remediation is provided. The method is implemented on a computing device comprising a memory device coupled to at least one processor. The method includes (a) storing within a database an inventory of computer assets included within a computer ecosystem; (b) retrieving a vulnerability report including vulnerability definitions; (c) analyzing the database to identify a potential vulnerability by comparing the computer assets stored within the database to the vulnerability definitions; (d) upon detecting the potential vulnerability, determining a service owner associated with the computer assets identified as being involved in the potential vulnerability; and (e) providing content to a user computing device associated with the service owner causing the user device to display a notification alert advising the service owner of the potential vulnerability and providing a remediation plan to address the potential vulnerability.

In a further aspect, at least one non-transitory computer-readable storage media having computer-executable instructions embodied thereon for authenticating an online user is provided. When executed by at least one processor, the computer-executable instructions cause the at least one processor to (a) store within a database an inventory of computer assets included within a computer ecosystem; (b) retrieve a vulnerability report including vulnerability definitions; (c) analyze the database to identify a potential vulnerability by comparing the computer assets stored within the database to the vulnerability definitions; (d) upon detecting the potential vulnerability, determine a service owner associated with the computer assets identified as being involved in the potential vulnerability; and (e) provide content to a user computing device associated with the service owner causing the user device to display a notification alert advising the service owner of the potential vulnerability and providing a remediation plan to address the potential vulnerability.

BRIEF DESCRIPTION OF THE DRAWINGS

FIGS. 1-5 show example embodiments of the methods and systems described herein.

FIG. 1 is a block diagram of an example embodiment of a dynamic vulnerability detection and remediation (DVDR) system in accordance with at least one embodiment of the present disclosure.

FIG. 2 is a flow diagram of an example process for dynamic vulnerability detection and remediation using the DVDR system shown in FIG. 1.

FIG. 3 is a block diagram of an example embodiment of a computer system used for dynamic vulnerability detection and remediation that is part of the system shown in FIG. 1.

FIG. 4 illustrates an example configuration of a user computing device that is part of the system shown in FIG. 3.

FIG. 5 illustrates an example configuration of a server system that is part of the system shown in FIG. 1 and in accordance with one example embodiment of the present disclosure.

Figure 1:
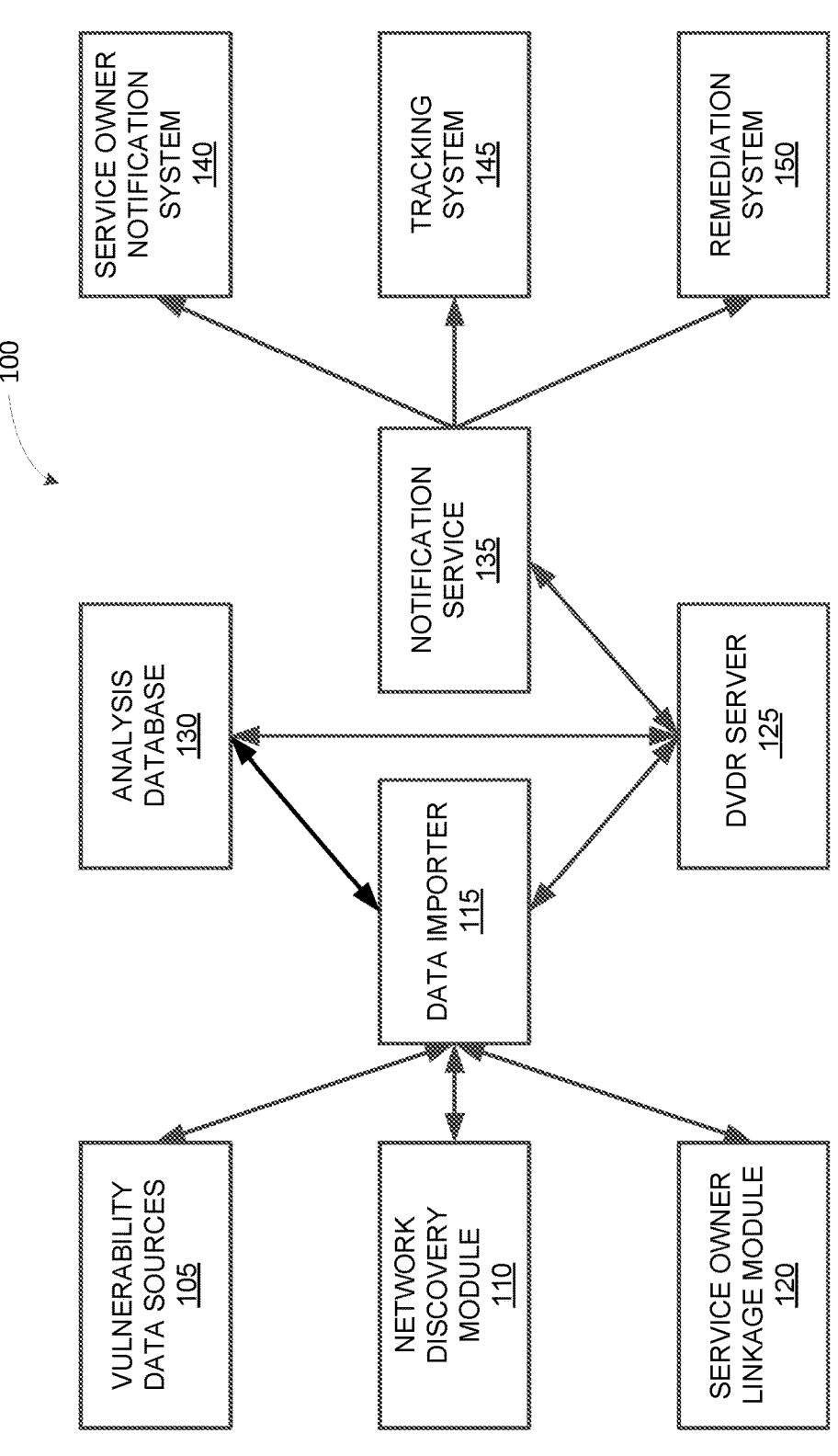

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein relate generally to managing cybersecurity vulnerability detection and remediation. The systems and methods described herein include a dynamic vulnerability detection and remediation (DVDR) computer system that is configured to (a) analyze a current state of the computer devices and/or computer assets included within a computer network and/or a cloud environment (collectively "computer ecosystem"), (b) compare those states to vulnerability reports that include vulnerability definitions, (c) identify potential vulnerabilities within the computer assets from the comparison with the vulnerability definitions, (d) determine and initiate one or more remediation actions needed to remediate the identified vulnerabilities, (e) alert the appropriate service owners assigned to the compromised computer assets, (f) track the remediation efforts, and compare the updated state of the computer assets within the computer ecosystem to determine if the vulnerability has been resolved for the network or enterprise.

As used herein, vulnerabilities occur when computer devices or assets have specific combinations of software and/or hardware that may allow a malicious actor to compromise the computer device or asset. The compromise may include, but is not limited to, infection by malware, ransomware, trojan horse viruses, and/or other viruses or allowing the malicious actor access to information and computer devices on the network/enterprise.

The dynamic vulnerability detection and remediation (DVDR) system described herein includes a scanning tool that automatically detects critical vulnerabilities within a computer network/cloud environment (computer ecosystem) and sends reports to service owners advising them of the vulnerabilities that are identified against the software and/or hardware associated within the system with those service owners. The DVDR system imports or ingests information of multiple different types and different formats including, but not limited to, vulnerability definitions (such as from NIST (National Institute of Standards and Technology)), a discovered mapping of the infrastructure of the computer network and/or enterprise (computer ecosystem) including a full inventory of the software and/or hardware used within the ecosystem, and a database establishing the corresponding service owners of each computer asset within the inventory. The three databases (vulnerability definition database, computer ecosystem infrastructure database, and service owner's database) are all polled according to a schedule. Accordingly, when the DVDR system detects a vulnerability within the network, the service owner is immediately notified, allowing for a more efficient notification and, ultimately, remediation of the vulnerability detected.

The DVDR system is configured as a vulnerability scanner that automatically detects critical vulnerabilities within connected networks. The DVDR system receives vulnerability definitions from vulnerability reporting systems, such as, but not limited to, NIST (National Institute of Standards and Technology) and SNYK, a developer security platform. The DVDR system cross references those vulnerability definitions with a full inventory of software and/or hardware assets that are being used by the computer devices in the connected networks/enterprise. The DVDR system identifies the service owners for the compromised assets. The DVDR system generates and transmits reports to the service owners with the vulnerabilities that are identified against their hardware, software, and/or other products. In some embodiments, the DVDR system rates and prioritizes the discovered vulnerabilities, such as based on a number of devices or assets impacted and/or ease of exploitation of the vulnerability. In further embodiments, the DVDR system activates automatic remediation systems that patch and/or deploy update software versions and/or adjust hardware or configuration settings to resolve the vulnerability. In still further embodiments, the DVDR system tracks the resolution of the identified vulnerabilities to allow for up-to-date monitoring and resolution.

While the above describes the dynamic vulnerability detection and remediation (DVDR) system being used for analyzing a computer network/ecosystem, one having skill in the art would understand that other implementations may be used as well. The system should not be limited to such applications.

At least one of the technical problems addressed by this system includes: (i) increased accuracy of analyzing large amounts of computer assets used within a computer ecosystem including gathering data identifying an inventory of assets within the ecosystem and comparing that inventory to an updated list of vulnerability definitions; (ii) formatting disparate data into a single data format for improved analysis and comparison, and thereby reducing processing requirements for the analysis of large computer networks; (iii) improved processing of data to compare computer asset data to vulnerability definition data to identify potential vulnerabilities; and (iv) improved notification to service owners of the potential vulnerabilities and tracking of remediation efforts.

A technical effect of the systems and processes described herein is achieved by performing one or more of the following steps: a) generate and store a database of an inventory of a computer assets used within a computer ecosystem; b) receive a vulnerability report from a vulnerability database including vulnerability definitions defining the affected software and/or hardware, version information for the affected software and/or hardware, a description of the vulnerability, related vulnerabilities, and affected industries that threats to the vulnerability may have been seen in; c) analyze the database of computer assets by comparing the inventory of assets to the vulnerability definitions to identify a potential vulnerability within the ecosystem; d) upon detecting the potential vulnerability, determine a service owner associated with the potential vulnerability; e) upon detecting the potential vulnerability, generate and transmit at least one notification alert to the service owner about the potential vulnerability; f) upon detecting the potential vulnerability, determine a priority of the potential vulnerability based upon the analysis; g) upon detecting the potential vulnerability, perform at least one remediation action based upon the potential vulnerability; h) wherein the at least one remediation action includes at least one of updating a software version, deploying a software patch, or changing a hardware or configuration setting; i) upon detecting the potential vulnerability in the database, generate a ticket or record in a tracking system for the potential vulnerability; j) receive an updated inventory of the computer assets within the computer ecosystem at a subsequent time; k) analyze the updated inventory and compare to an update set of vulnerability definitions to identify a new potential vulnerability; l) determine that the potential vulnerability is resolved based upon the analysis; m) wherein the indication of the potential vulnerability includes a CPE string; n) wherein the inventory of the computer network includes a plurality of CPE strings for each computer device in the computer network; o) analyze the database for the indication of the potential vulnerability by comparing the CPE string for the indication to the plurality of CPE strings in the inventory of the computer network; and p) filter the inventory of the computer network to determine a plurality of unique CPE strings for the analysis.

As will be appreciated, based on the description herein the technical improvement in the dynamic vulnerability detection system as described herein is a computer-based solution to a technical deficiency or problem that is itself rooted in computer technology (e.g., the problem itself derives from the use of computer technology). More specifically, vulnerability detection systems require tremendous amounts of resources when analyzing large amounts of systems. Dynamic vulnerability detection and remediation methodologies (e.g., DVDR) are useful to process and analyze computer devices in an efficient manner and significantly reduce the computer processing resources required to analyze large computer networks more efficiently. Accordingly, to address this problem, the systems and methods described herein address this technical problem by using a dynamic vulnerability detection and remediation (DVDR) server and DVDR engine to analyze large computer networks in reduced time.

The following detailed description of the embodiments of the disclosure refers to the accompanying drawings. The same reference numbers in different drawings may identify the same or similar elements. Also, the following detailed description does not limit the claims.

Described herein are computer systems such as authentication computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, NoSQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to authenticating users for transactions conducted over an electronic payment network.

FIG. 1 is an expanded block diagram of an example embodiment of a computer system 100 used for dynamic vulnerability detection and remediation (DVDR) in accordance with at least one embodiment.

In the exemplary embodiment, the system 100 includes or is in communication with one or more vulnerability data sources 105. The vulnerability data sources 105 are external or internal servers that provide information about discovered vulnerabilities. This information includes, but is not limited to, what the vulnerability is, when it was discovered, which systems/services/applications are affected by the vulnerability, how the vulnerability is accessed, other networks that may have been affected by the vulnerability, and/or any other information about the vulnerability to allow the system 100 to work as described herein.

In at least one embodiment, the one or more vulnerability data sources 105 includes information from NIST (National Institute of Standards and Technology), which tracks vulnerabilities in both software and hardware. The NIST data source 105 provides CVE (Common Vulnerability and Exposure) data. These include the actual vulnerability definitions. These include CPE (Common Platform Enumeration) data for what infrastructure is exposed to the vulnerability. The CPE data includes strings that describe a type of infrastructure/application item. The system 100 uses the CPE data to map computer network infrastructure to vulnerabilities. In some embodiments, the vulnerability data sources 105 also include supplemental feeds that detail logic and strategy about consuming from the CVE data. In some embodiments, the vulnerability data sources 105 includes an API (application programming interface) feed that provides the data.

In the exemplary embodiment, a data importer 115 receives the data from the vulnerability data sources 105. The data importer 115 parses the data based upon the schema that the data is formatted in from the vulnerability data sources 105. In some embodiments, the vulnerability data sources 105 may update their schema over time, which may require the data importer 115 to adjust how the schema data is parsed.

In some embodiments, another vulnerability data source 105 includes a tool that provides a vulnerability criticality score. The system 100 can use the score to assess what vulnerabilities should be targeted first for remediation. In these embodiments, the system 100 uses the vulnerability criticality score to prioritize the vulnerabilities for remediation, as described herein.

In some further embodiments, one of the vulnerability data sources 105 includes additional open-source vulnerability management databases. The information in these databases can be used to reinforce the information received from other data sources. This may be used to ensure that all vulnerabilities are properly analyzed.

In the exemplary embodiment, the vulnerability data sources 105 include a CPE Match Feed, such as, but not limited to, the NIST CPE feed. The CPE match feed is configured identify CPE URI (uniform resource identifier) matches in a relatively simplistic format. The CPE feed contains sets of CPE match criteria (CPE match ranges and/or CPE match strings). By searching the CPE match feed for an identical set of match criteria, the system 100 will be able to discern any matches for that CPE match criteria within the corresponding CPE name array.

The CPE match feed is used with network discovery module 110. The network discovery module 110 is a network and infrastructure configuration discovery and a dependency mapping system which provides visibility into hardware, software, packages, and service dependencies across every endpoint on a connected network and/or cloud environments. In each scan the network discovery module 110 delves into the information and dependencies for all software, hardware, network, storage, mainframe, and cloud services. The network discovery module 110 provides the system 100 with the context needed to create an application map for the network/cloud environment.

In the scope of system 100, network discovery module 110 is used to collect and record critical configuration details about software, firmware, Java archives, libraries, containers using those libraries, software and package versions their Common Platform Enumerations (CPEs), IP address, location, owner/assigned to, and/or any other information desired to allow the system 100 to work as described herein. In the exemplary embodiment, the system 100 uses the CPE to correlate CVE records from the National Vulnerability Database (NVD) and/or other vulnerability data sources 105.

In some embodiments, the network discovery module 110 provides information on all known hosts. The information includes the IP address, MAC address and other machine identity fingerprinting for each host, so that the system 100 can determine which network perimeter contains the corresponding host. The information may also include all libraries found on each host, along with which software, container, or cluster the host is using it, if possible.

In the scope of system 100, the data importer 115 is also in communication with one or more service owner linkage modules 120. When new vulnerabilities are received or detected the service owner linkage module 120 are polled to determine contact information for the service owner responsible for keeping the device/hardware/service/application up to date. As described below, data from the one or more service owner linkage modules 120 is used by a notification service 135.

The data importer 115 receives data from the vulnerability data sources 105, the network discovery module 110, and the service owner linkage modules 120. The data importer 115 then provides the data to the dynamic vulnerability detection and remediation (DVDR) server 125. In some embodiments, the data importer 115 provides some or all of the received data to one or more analysis databases 130. Then the data importer 115 reports the storage of the data to the DVDR server 125.

In the exemplary embodiment, the data importer 115 is a module-based approach to importing data sources from remote services. The primary responsibility of the data importer 115 is to fetch data from a number of sources and store them into the database 130. In some embodiments, the data importer 115 will receive requests from a GUI (graphical user interface), API (application programming interface) or the command line to run certain modules or perform certain actions. In at least one embodiment, the data importer 115 has different modules for interacting with different data sources 105. In these embodiments, the modules may be run individually or in concert with other modules.

In the exemplary embodiment, each module is configured to only update data that has changed. This is to save computer resources, such as network bandwidth, by not performing a full import every time the corresponding module is run. Each module is further configured to check the schema/version of the data format for each data source 105 and to notify one or more users if the schema/version of the data format has changed.

In at least one embodiment, each module is configured to have an independent timer, so that the modules do not all trigger at the same time. By not triggering at the modules the same time, this reduces the computer resources required to execute the data importer 115 and thereby the system 100 as a whole. In one further embodiment, the configuration data for the modules of the data importer 115 is stored in the database 130.

Each module may contain operational configuration data in the database 130. The configuration data includes, but not limited to, timing frequency, whether the feed is enabled, current schema version, etc.

In the exemplary embodiments, the data importer includes, but is not limited to, the following modules: the service owner module, which downloads the various contact details for each piece of infrastructure in the network; data source CPE, which builds a list of all new CPE strings that the data source 105 knows about since the last import; CVE module, which builds a list of all new CVE objects that have been updated since the last import; scores module, which downloads the vulnerability scores; additional data sources modules, which provides additional data from other data sources 105; discovery host module, which download all hosts from the network discovery module 110 updated since last import; discovery VM module, which downloads all of virtual machines (VMs) from the network discovery module 110 updated since last import; discovery CPE module, which downloads all of CPE data from the network discovery module 110 updated since last import; and a scheduler module, which keeps track of when each module is scheduled to execute. In some embodiments, different modules execute at different times and frequencies, including multiple times a day.

The DVDR server 125 is programmed to access the data in the one or more analysis databases 130 and the data provided by the data importer 115 to determine if any of the vulnerabilities provided by the vulnerability data sources 105 might be an issue for one or more computer devices on the computer networks being analyzed. In at least one embodiment, the DVDR server 125 compares the CPE strings associated with the vulnerabilities with the CPE strings provided by network discovery module 110. If there is a match, then the DVDR server 125 instructs a notification service 135 to perform on or more actions. The actions include, but are not limited to, using the service owner notification system 140 to notify the service owner for the service associated with the vulnerability, generating a ticket or a record for a tracking system 145 for tracking the potential vulnerability and fixes, and/or causing a remediation system 150 to perform one or more automatic remediations. The service owner notification system 140 may notify the user via a number of different communication channels, including, but not limited to, email, text message, SMS message, MMS, message, push notification, and/or any other communication channel desired.

In some embodiments, updates using auto remediation may create other problems in other parts of the computer ecosystem. In these embodiments, the DVDR server 125 also transmits one or more recommendations to the services team about how to remediate the issue. Then the services team has a limited period of time to remediate the issue. The issue is tracked curing that time period to ensure that it is remediated by the deadline. If the issue has not been remediated by the predetermined deadline, the DVDR server 125 transmits one or more notifications to additional team members and potentially escalates the issue.

In the exemplary embodiment, the service owner is notified via email or other methodology to inform them of the vulnerability that may affect the service that they are responsible for. In some embodiments, the service owner is responsible for the service in the computer network. In other embodiments, the service owner is responsible for the service on all computer networks. In these embodiments, the service owner may be the creator or writer of the code for the service. The service owner may also be a company responsible for keeping the service running and/or up to date.

In the exemplary embodiment, the system 100 includes a tracking system 145 for tracking vulnerabilities of the services and computer devices of the computer network. The tracking system 145 may be a ticket system that creates a ticket or a record for each detected vulnerability. The tracking system 145 then monitors to determine when the vulnerability has been corrected, such as having the software behind the affected service updated and/or patched to remove the vulnerabilities. In some embodiments, the tracking system 145 determines that the vulnerability has been resolved when the DVDR server 125 no longer detects the vulnerability in the devices of the computer network. In some embodiments, the tracking system 145 transmits one or more alerts to one or more users if the vulnerability has not been resolved/remediated/patched in a predetermined period of time. In some embodiments, the tracking system 145 works with the service owner notification system 140 to track the correction of the vulnerability by the service owner.

In the exemplary embodiments, the system 100 includes a remediation system 150. The remediation system 150 is configured to provide automatic remediation of one or more detected vulnerabilities. For example, the remediation system 150 may determine that a current version of a library/software program/etc. does not include the vulnerability and automatically update the library/software program/etc. to the current version.

In the exemplary embodiment, the DVDR server 125 uses one or more service owner linkage module 120 to determine the service owner associated with a discovered vulnerability. new vulnerabilities arrive or detected, auto-email the owner with some canned report. The DVDR server 125 may use the data from the network discovery module 110 to determine an owner of item that is identified vulnerable. The DVDR server 125 uses the information from network discovery module 110 to access the service owner linkage module 120 to determine the Product/Technical Asset that was identified as potentially vulnerable. The DVDR server 125 uses the service owner linkage module 120 to lookup the Remedy Support Group of Interest. The Remedy Support Group of Interest is used in ticket assignment work order. This may be for generating a notification ticket with a request to investigate and resolve the vulnerability. The Remedy Support Group of Interest brings together the Who (assignee Group), the What (CVE Identifier), the When (now timeline triggered service-level agreement (SLA) for the Work Order), the Where (on the System that the information is provided for), and the Why (Vulnerability description with short summary of damage attacker can cause).

One of the key operating elements in the notification service is the detection and remediation engine provided by the DVDR server 125. The purpose is to take the extremely dynamic structure contained in each of the NIST vulnerability definitions, and then query the data in the tables stored in the analysis database 130 and apply additional analysis logic there.

The DVDR server 125 uses CPE (Common Platform Enumeration) data for what infrastructure is exposed to the vulnerability. A CPE is a string that represents a library, piece of software, or other type of asset. An example of a CPE string looks like this: cpe:2.3:a:paloaltonetworks:cortex_xdr_agent:*:*:*:*:*:*:*:*. Exposure to vulnerabilities within NIST means that NIST maps these CPE strings to each vulnerability. The NIST system provides CVE (Common Vulnerability and Exposure) data. As the DVDR server 125 processes the CVE data into one or more CVE tables. The DVDR server 125 carefully monitors the nodes mapping. This is how the CPE strings are linked to the vulnerability. This data has the potential to be complicated as vulnerabilities aren't always as simple as library version X=problem. Sometimes it requires a specific combination of Operating System, dependent libraries, and individual vendor products, all working together to cause a vulnerability. The relationships in the node array can be very complex branches of long AND or OR clauses. Trying to represent that as a simple table format that can be easily queried is difficult at best, to impossible at worst.

What this means is that in order to find what vulnerabilities the networks and individual devices are exposed to, in some embodiments, the DVDR server 125 has to crawl ALL of the data from the beginning of time. That is a very cumbersome task and resource intensive task, which could take hours to run. However, the DVDR server 125 is configured to narrow down the search band to reduce the resources required. If the DVDR server 125 crawls through the nodes mapping and notes each unique CPE entry that's contained within, along with the corresponding CVE ID to create a CPE_MAP, this makes future searching easier and less resource intensive. The DVDR system can search a CPE_MAP table for any CPE ID and get back a list of all vulnerabilities that affect that particular object. In the exemplary embodiment, the CPE_MAP table is stored in the analysis database 130.

In the exemplary embodiment, the CPE_MAP includes, but is not limited to, at least the following fields: CVE, Min, Max, and CPE. The CVE refers to the specific vulnerability and the CPE that it is linked from. The Min is the lowest version of the software/service/library/etc. that is vulnerable to this CVE. The Max is the lowest version of the software/service/library/etc. that is vulnerable to this CVE. The CPE refers to what software/service/library/etc. is vulnerable.

In at least one example, the network has a particular piece of technology, say JBoss 6.2, that the user wants to see whether it is vulnerable to anything. The DVDR server 125 looks in the CPE_MAP table to see if there's any matches for that version to the appropriate JBoss CPE string. If there are matches, the DVDR server 125 generates a list of those CVE IDs. Then the DVDR server 125 can then go to the CVE table and crawl each CVE and walk through the nodes structure to see if there is a match.

The system 100 may also include a CPE_MATCH table that contains a mapping of CPEs that are aliases for each other. Sometimes CPEs can be pegged at different levels of versioning and/or releases. Sometimes the CPEs are generically addressed. The DVDR server 125 checks this table to ensure that it has all of the aliases for each CPE string. Anything that applies to any alias of an object, applies transitively to all other aliases of that object.

In at least one embodiment, the DVDR server 125 will take the CPE string from network discovery module 110. Then the DVDR server 125 queries the CPE_MATCH table for Name="<CPE string>" and the table returns a match, then the DVDR server 125 can also search that for vulnerabilities.

As an example, suppose the vulnerability data source 105 provides with the following CPE string: cpe:2.3:a:oracle:mysql:5.5.0:*:*:*:*:*:*:*. In this example, this string maps to a specific version of Oracle-5.5.0. But there may be multiple entries in the CPE_MATCH table that need to be search. In this case, the other entries may include 5.5, Oracle 5 and Oracle Base Oracle (cpe:2.3:a:oracle:mysql:5.0:*:*:*:*:*:*:*; cpe:2.3:a:oracle:mysql:5:*:*:*:*:*:*:*; cpe:2.3:a:oracle:mysql:*:*:*:*:*:*:*:*).

Combined with the start and end version values in the table, the DVDR server 125 can build several additional CPE strings to search for vulnerabilities under. This allows for a greater chance of catching when vulnerabilities match products that are deployed in the computer network. The CPE_MATCH table should contain all of the matched vulnerabilities in the computer network and/or the enterprise. In some embodiments, the DVDR server 125 reviews the CPEs in the analysis database 130 to determine if they fail to match any items in the network for a predetermined period of time. If they fail to match for the predetermined period of time, the DVDR server 125 removes the corresponding CPEs. In the exemplary embodiment, the CPE_MATCH table is stored in the analysis database 130.

In the exemplary embodiment, the CPE_MATCH includes, but is not limited to, at least the following fields: CPE, Name, Start, and End. The CPE is the field that will be returned when the value in the Name is found. The Name is to be search one to replace the name with a CPE value. The Start refers to the maximum version to match. The End refers to the minimum version to match.

The system 100 may also include a FOUND_VULNS table that contains all of the matched vulnerabilities in the monitored computer network. In some embodiments, the DVDR server 125 reviews the FOUND_VULNS in the analysis database 130 to determine if they fail to match any items in the network for a predetermined period of time. If they fail to match for the predetermined period of time, the DVDR server 125 removes the corresponding vulnerabilities.

In the exemplary embodiment, the FOUND_VULNS table includes, but is not limited to, the following fields: CPE, CVE, HOST, PATH, FOUND, LAST, PRODUCT, CONTACT, REMEDY, and TICKET. The CPE is the CPE affected. CVE is the CVE detected to be affecting the CPE. The HOST is the computer system etc. where the vulnerability lies. The PATH is the path to the affected library etc. FOUND refers to the data that the vulnerability was detected. In some embodiments, this field does not get updated. LAST refers to the most recent time that the CVE was detected against this CPE on this HOST. This value is updated when detected. PRODUCT refers to the product that the vulnerability is tied to. The CONTACT is responsible for resolving the vulnerability. In some embodiments, the CONTACT is the service owner. The REMEDY refers to the remedy ticket for the vulnerability. A TICKET refers to another ticketing system used to track the vulnerability and its resolution.

The above tables are for explanatory purposes only and are not to be considered limiting in this disclosure. One having skill in the art would understand that other tables and/or fields may be used to implement this disclosure.

In some embodiments, the DVDR server 125 and the notification service 135 generate a full CVE report. The CVE report may be generated after one of the vulnerability data sources 105, such as NIST, have updated their data. The CVE report may also be generated after the network discovery module 110 updated its data. The DVDR server 125 filters the contents of the information provided by network discovery module 110 for unique library versions with the computer network and/or cloud environment. The filtering provides CPE strings for these unique library versions. The DVDR server 125 searches each unique CPE string is searched for a match in the data provided by the vulnerability data sources 105. If no matches exist for that CPE string, the DVDR server 125 moves to the next CPE. For each CPE string that contains one or more matches in the data provided by the vulnerability data sources 105, the DVDR server 125 takes the following actions. First, the DVDR server 125 searches for the CPE string inside the information provided by the network discovery module 110 to obtain all unique hosts in the computer ecosystem. Next, the DVDR server 125 adds each host's association with the appropriate CVE to identified vulnerabilities. For each host with a vulnerability, the DVDR server 125 find the appropriate contact within the service owner linkage module 120 and associate that contact with the vulnerability. The DVDR server 125 also associates the vulnerability with a specific product. The DVDR server 125 writes all association data into FOUND_VULNS table. This information may also then be written to a report, displayed on a dashboard, and/or provided via other notifications via the notification service 135.

In some embodiments, the data may be provided in one of many reports. This report may allow the user to filter the contents of the FOUND_VULNS table according to whatever criteria the report is running against. Examples of possible to build complex reports against, any and all apply in any combination, include but are not limited to search by product, search by contact/owner, search by CVE, search by CPE, search by Path, and/or search by Host.

In some embodiments, the notification service 135 transmits one or more messages to each unique owner in the dataset returned with all matching vulnerabilities, such as via service owner notification system 140. If the remediation system 150 is active, a ticket or record for the tracking system 145 should be generated if one has not already been. In these embodiments, the ticket or record is created at the CVE level, NOT at the individual host level. The ticket number (identifier) should be stored in the FOUND_VULNS table.

FIG. 2 is a flow diagram of an example process 200 for dynamic vulnerability detection and remediation using the DVDR system 100 (shown in FIG. 1). In the exemplary embodiment, process 200 is performed by the DVDR server 125 (shown in FIG. 1).

In the exemplary embodiment, the DVDR server 125 stores 205 a database of an inventory of computer devices for a computer ecosystem. The database of the inventory may be stored in the analysis database 130 (shown in FIG. 1). The database of the inventory is provided by the network discovery module 110. The network discovery module 110 is used to collect and record critical configuration details about software, firmware, Java archives, libraries, containers using those libraries, software, and package versions their Common Platform Enumerations (CPEs), IP address, location, owner/assigned to, and/or any other information desired to allow the system 100 to work as described herein.

In the exemplary embodiment, the DVDR server 125 receives 210 an indication of a potential vulnerability. In the exemplary embodiment, the DVDR server 125 receives the indication of the potential vulnerability from one or more vulnerability data sources 105 (shown in FIG. 1), such as NIST. The potential vulnerability may be provided to the DVDR server 125 via the data importer 115 (shown in FIG. 1).

In the exemplary embodiment, the DVDR server 125 analyzes 215 the database for an indication of the potential vulnerability. In these embodiments, the DVDR server 125 compares the CPE of the potential vulnerability to the CPES of the computer devices in the computer network/cloud environment for a match.

Upon detecting the potential vulnerability in the database, the DVDR server 125 determine 220 a priority of the potential vulnerability based upon the analysis. This priory may be based on the number of computer devices affected, the severity of the vulnerability, the ease of use of the vulnerability, the ease of repair of the vulnerability, and/or other factors as desired by the user. The priorities may be set by one or more users and/or technical managers. The priorities may be based on the computer devices affected, the severity of the vulnerability, and/or other business reasons.

Upon detecting the potential vulnerability in the database, the DVDR server 125 determines 225 a service owner associated with the potential vulnerability. In the exemplary embodiment, the DVDR server 125 determines the service owner based upon information provided by the service owner linkage module 120.

Upon detecting the potential vulnerability in the database, DVDR server 125 generates 230 and transmit at least one notification for the service owner about the potential vulnerability. In some embodiments, the notification may be through a notification service 135 (shown in FIG. 1) and/or the service owner notification system 140 (shown in FIG. 1).

Upon detecting the potential vulnerability in the database, DVDR server 125 performs 235 at least one remediation action based upon the potential vulnerability. The remediation may include, but is not limited, using the remediation system 150 (shown in FIG. 1) to update a software version, apply a patch, change a hardware or a configuration setting, generate a ticket or record for tracking the resolution of the vulnerability via a tracking system 145 (shown in FIG. 1), instructing the service owner to resolve the vulnerability via the service owner notification system 140, and/or any other action to resolve the vulnerability.

The system of claim 1, wherein upon detecting the potential vulnerability in the database, the at least one processor is further programmed to perform at least one remediation action based upon the potential vulnerability.

In some further embodiments, upon detecting the potential vulnerability in the database, the DVDR server 125 generates a ticket or a record in a tracking system for the potential vulnerability. In these embodiments, the DVDR server 125 receives an updated inventory of the computer network at a subsequent time. Then, the DVDR server 125 analyzes the updated inventory for the indication of the potential vulnerability. The DVDR server 125 determines that the potential vulnerability is resolved based upon the analysis.

In additional embodiment, the indication of the potential vulnerability includes a CPE string. The inventory of the computer network includes a plurality of CPE strings for each computer device in the computer network. The DVDR server 125 analyzes the database for the indication of the potential vulnerability by comparing the CPE string for the indication to the plurality of CPE strings in the inventory of the computer network. The DVDR server 125 filters the inventory of the computer network to determine a plurality of unique CPE strings for the analysis.

In some embodiments, the DVDR server 125 trains one or more models to determine when to perform automatic remediation and when to transmit notifications to the service teams/service owners. In some of these embodiments, the DVDR server 125 performs the automatic remediation and notifies the service owners of the change. In some of these embodiments, the model is trained using historical data from a plurality of previous analysis.

Figure 3:
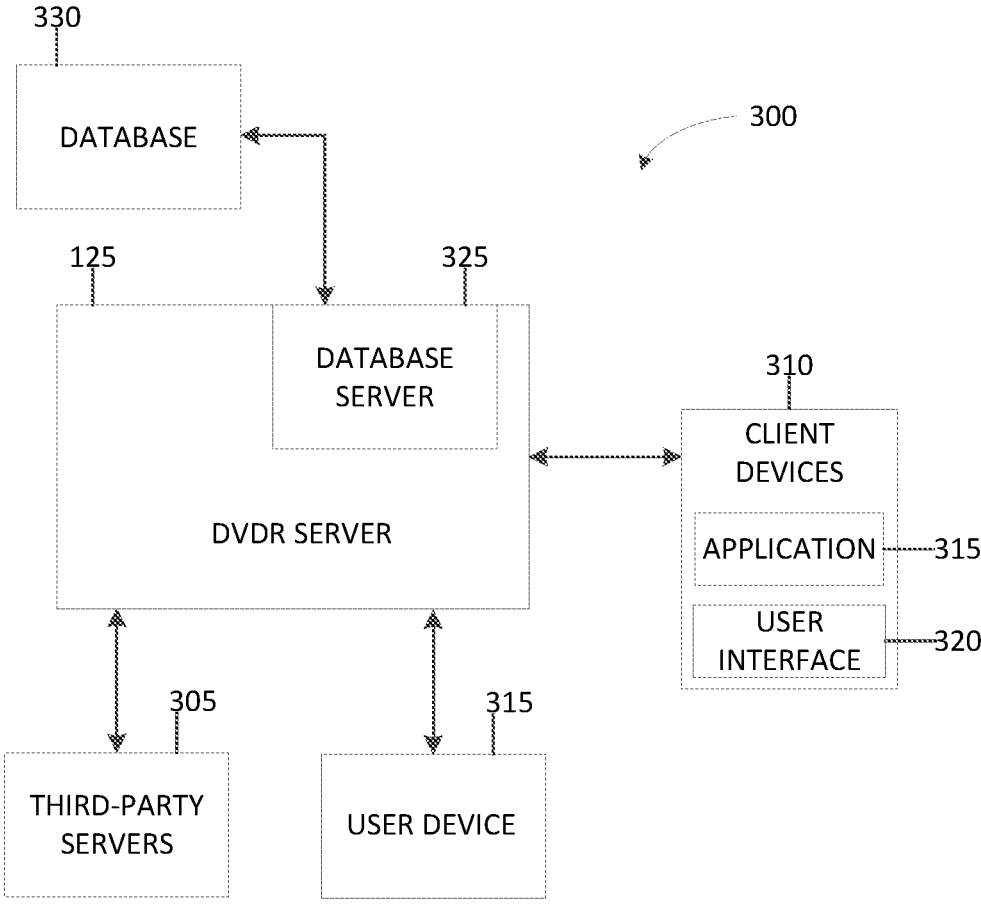

FIG. 3 is an expanded block diagram of an example embodiment of a computer system 300 used for dynamic vulnerability detection and remediation. In the exemplary embodiment, system 300 may be used for analyzing vulnerabilities and computer devices to determine if there are potential vulnerabilities on the computer systems. In at least one embodiment, system 300 is in communication with system 100 (shown in FIG. 1). In additional embodiments, system 300 is a part of system 100.

In the exemplary embodiment, third-party servers 305 are computers that include a web browser or a software application, which enables third-party servers 305 to access remote computer devices, such as DVDR server 125, using the Internet or other network. More specifically, third-party servers 305 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Third-party servers 305 may be any device capable of accessing the Internet including, but not limited to, additional servers and software, a desktop computer, a laptop computer, a personal digital assistant (PDA), a cellular phone, a smartphone, a tablet, a phablet, wearable electronics, smart watch, or other web-based connectable equipment or mobile devices. In some embodiments, the third-party servers 305 are separate from and in communication with the DVDR server 125 and/or the computer ecosystem being analyzed and include, but are not limited to, vulnerability data sources 105, service owner linkage module 120, and service owner notification system 140 (all shown in FIG. 1). In other embodiments, the third-party servers 305 are a part of the DVDR server 125 and/or the computer network/cloud environment being analyzed and include, but are not limited to, network discovery module 110, data importer 115, notification service 135, tracking system 145, and/or remediation system 150 (all shown in FIG. 1).

In the exemplary embodiment, client devices 310 are computers that include a web browser or a software application 315, which enables client devices 310 to access remote computer devices, such as DVDR server 125, using the Internet or other network. More specifically, client devices 310 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client devices 310 may be any device capable of accessing the Internet including, but not limited to, additional servers and software, a desktop computer, a laptop computer, a personal digital assistant (PDA), a cellular phone, a smartphone, a tablet, a phablet, wearable electronics, smart watch, or other web-based connectable equipment or mobile devices. In some embodiments, the client devices 310 include a user interface 320 to allow the user or additional systems to interact with data from the DVDR server 125 directly or through an API (application programming interface).

In the exemplary embodiments, dynamic vulnerability detection and remediation (DVDR) server 125 analyzes data about vulnerabilities and computer devices on the computer ecosystem to detect if any of the computer devices may be susceptible to the vulnerability. In some embodiments, the DVDR server 125 is in communication with one or more client devices 310 and one or more third-party servers 305. In some embodiments, DVDR server 125 is associated with system 100. In other embodiments, the DVDR server 125 is separate from system 100. In the exemplary embodiments, DVDR server(s) 125 are computers that include a web browser or a software application, which allow for communication with a plurality of client devices 310, using the Internet or other network. More specifically, DVDR servers 125 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. DVDR servers 125 may be any device capable of accessing the Internet including, but not limited to, additional servers and software, a desktop computer, a laptop computer, a personal digital assistant (PDA), a cellular phone, a smartphone, a tablet, a phablet, wearable electronics, smart watch, or other web-based connectable equipment or mobile devices.

A database server 325 is connected to one or more databases 330. In one embodiment, centralized database 330 is stored on the DVDR server 125 and can be accessed by potential users at one of client devices 310 by logging onto DVDR server 125 through one or more client systems. In an alternative embodiment, database 330 is stored remotely from DVDR server 125 and may be non-centralized.

Database 330 may include a single database having separated sections or partitions, or may include multiple databases, each being separate from each other. Database 330 may be a database configured to store information about computer device inventory and potential vulnerabilities and may be similar to analysis database 130 (shown in FIG. 1). Database 330 may also store CPEs, CVEs, and other data as needed herein. In some embodiments, CPE_MAP table, CPE_MATCH table, and FOUND_VULNS table may be stored in database 330.

Figure 4:
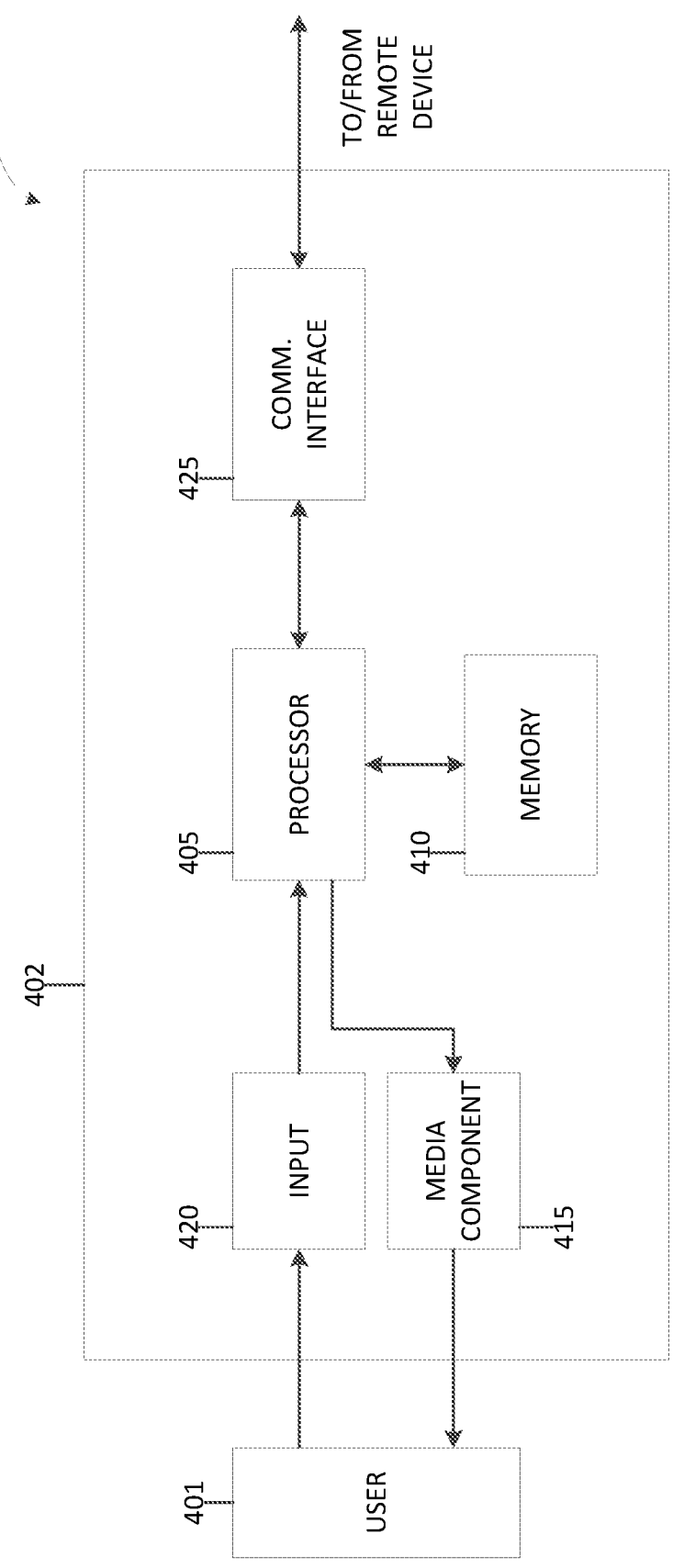

FIG. 4 illustrates an example configuration of a user computing device 402. User computing device 402 may include, but is not limited to, data importer 115, notification service 135, remediation system 150 (all shown in FIG. 1), and client devices 310 (shown in FIG. 3). User computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

User computing device 402 also includes at least one media output component 415 for presenting information to a user 400. Media output component 415 is any component capable of conveying information to user 400. In some embodiments, media output component 415 includes an output adapter such as a video adapter and/or an audio adapter. An output adapter is operatively coupled to processor 405 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, user computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

User computing device 402 may also include a communication interface 416, which is communicatively couplable to a remote device such as DVDR server 125 (shown in FIG. 1). Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from DVDR server 125. A client application allows user 401 to interact with, for example, vulnerability reports. For example, instructions may be stored by a cloud service, and the output of the execution of the instructions sent to the media output component 415.

Processor 405 executes computer-executable instructions for implementing aspects of the disclosure. In some embodiments, the processor 405 is transformed into a special purpose microprocessor by executing computer-executable instructions or by otherwise being programmed.

Figure 5:
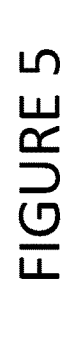

FIG. 5 illustrates an example configuration of a server system 500 such as DVDR server 125 (shown in FIG. 1), in accordance with one example embodiment of the present disclosure. Server system 500 may also include, but is not limited to, vulnerability data sources 105, network discovery module 110, data importer 115, service owner linkage module 120, DVDR server 125, notification service 135, service owner notification system 140, tracking system 145, and remediation system 150 (all shown in FIG. 1), third-party servers 305, and database server 325 (both shown in FIG. 3). In the example embodiment, server system 500 determines and analyzes patterns in transactions, as described herein.

Server system 500 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server system 500, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, Python, or other suitable programming languages, etc.).

Processor 505 is operatively coupled to a communication interface 515 such that server system 500 is capable of communicating with a remote device such as DVDR server 125 or another server system 500. For example, communication interface 515 may receive requests from a client device 310 (shown in FIG. 3) via the Internet, as illustrated in FIG. 3.

Processor 505 may also be operatively coupled to a storage device 525. Storage device 525 is any computer-operated hardware suitable for storing and/or retrieving data. In some embodiments, storage device 525 is integrated in server system 500. For example, server system 500 may include one or more hard disk drives as storage device 525. In other embodiments, storage device 525 is external to server system 500 and may be accessed by a plurality of server systems 500. For example, storage device 525 may include multiple storage units such as hard disks or solid-state disks in a redundant array of inexpensive disks (RAID) configuration. Storage device 525 may include a storage area network (SAN) and/or a network attached storage (NAS) system.

In some embodiments, processor 505 is operatively coupled to storage device 525 via a storage interface 520. Storage interface 520 is any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525.

Memory area 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only and are thus not limiting as to the types of memory usable for storage of a computer program.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, solid-state disk (SSD), diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; and Microsoft is a registered trademark of Microsoft Corporation, Redmond, Washington.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112 (f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dynamic vulnerability detection and remediation system comprising:

a memory device; and at least one processor coupled to the memory device, the at least one processor programmed to:

store within a database an inventory of computer assets included within a computer ecosystem, wherein the inventory includes a respective plurality of CPE strings as a definition of each computer asset, each CPE string including an asset identifier associated with the respective computer asset;

retrieve a vulnerability report including CVE data, the CVE data including a plurality of vulnerability CPE strings representing vulnerability definitions;

generate a CPE mapping table indexing the plurality of vulnerability CPE strings by at least one of a CPE identifier, a CVE identifier, and an asset version identifier;

analyze the database to identify a potential vulnerability by comparing the plurality of CPE strings of the inventory stored within the database to the CPE mapping table;

upon detecting the potential vulnerability, determine a service owner associated with the computer assets identified as being involved in the potential vulnerability; and provide content to a user computing device associated with the service owner causing the user device to display a notification alert advising the service owner of the potential vulnerability and providing a remediation plan to address the potential vulnerability.

2. The system of claim 1, wherein upon detecting the potential vulnerability in the database, the at least one processor is further programmed to determine a priority of the potential vulnerability based upon the analysis.

3. The system of claim 1, wherein upon detecting the potential vulnerability in the database, the at least one processor is further programmed to perform at least one remediation action based upon the potential vulnerability.

4. The system of claim 3, wherein the at least one remediation action includes at least one of updating a software version, applying a patch, or changing a configuration setting.

5. The system of claim 1, wherein upon detecting the potential vulnerability in the database, the at least one processor is further programmed to generate a ticket in a tracking system for the potential vulnerability.

6. The system of claim 1, wherein the at least one processor is further programmed to:

receive an updated inventory of the computer ecosystem at a subsequent time; and analyze the updated inventory for the potential vulnerability.

7. The system of claim 6, wherein the at least one processor is further programmed to determine that the potential vulnerability is resolved based upon the analysis.

8. The system of claim 1, wherein the at least one processor is further programmed to filter the CVE data to a isolate the plurality of vulnerability CPE strings for the analysis.

9. The system of claim 1, wherein the vulnerability defines one or more of affected software and/or hardware, version information for the affected software and/or hardware, a description of the vulnerability, related vulnerabilities, and affected industries.

10. The system of claim 1, wherein the at least one processor is further programmed to:

receive the vulnerability definitions in a first format;

convert the vulnerability definitions into a second format; and compare the vulnerability definitions in the second format to the database of the inventor of computer assets.

11. A computer-implemented method for dynamic vulnerability detection and remediation, the method implemented on a computing device comprising a memory device coupled to at least one processor, and the method comprises:

storing within a database an inventory of computer assets included within a computer ecosystem, wherein the inventory includes a respective plurality of CPE strings as a definition of each computer asset, each CPE string including an asset identifier associated with the respective computer asset;

retrieving a vulnerability report including CVE data, the CVE data including a plurality of vulnerability CPE strings representing vulnerability definitions;

generating a CPE mapping table indexing the plurality of vulnerability CPE strings by at least one of a CPE identifier, a CVE identifier, and an asset version identifier;

analyzing the database to identify a potential vulnerability by comparing the plurality of CPE strings of the inventory stored within the database to the CPE mapping table;

upon detecting the potential vulnerability, determining a service owner associated with the computer assets identified as being involved in the potential vulnerability; and providing content to a user computing device associated with the service owner causing the user device to display a notification alert advising the service owner of the potential vulnerability and providing a remediation plan to address the potential vulnerability.

12. The method of claim 11, wherein upon detecting the potential vulnerability in the database, the method further comprises performing at least one remediation action based upon the potential vulnerability, wherein the at least one remediation action includes at least one of updating a software version, applying a patch, or changing a configuration setting.

13. The method of claim 11 further comprising:

receiving an updated inventory of the computer network at a subsequent time;

analyzing the updated inventory for the indication of the potential vulnerability; and determining that the potential vulnerability is resolved based upon the analysis.

14. The method of claim 11 further comprising:

filtering the CVE data to isolate the plurality of vulnerability CPE strings for the analysis.

15. At least one non-transitory computer-readable storage media having computer-executable instructions embodied thereon for automatically capturing, analyzing, and displaying messaging data, wherein when executed by at least one processor, the computer-executable instructions cause the processor to:

store within a database an inventory of computer assets included within a computer ecosystem, wherein the inventory includes a respective plurality of CPE strings as a definition of each computer asset, each CPE string including an asset identifier associated with the respective computer asset;

retrieve a vulnerability report including CVE data, the CVE data including a plurality of vulnerability CPE strings representing vulnerability definitions;

generate a CPE mapping table indexing the plurality of vulnerability CPE strings by at least one of a CPE identifier, a CVE identifier, and an asset version identifier;

analyze the database to identify a potential vulnerability by comparing the plurality of CPE strings of the inventory stored within the database to the CPE mapping table;

upon detecting the potential vulnerability, determine a service owner associated with the computer assets identified as being involved in the potential vulnerability; and provide content to a user computing device associated with the service owner causing the user device to display a notification alert advising the service owner of the potential vulnerability and providing a remediation plan to address the potential vulnerability.

* * * * *